United States Patent
Lindsay et al.

(10) Patent No.: US 7,409,385 B2
(45) Date of Patent: Aug. 5, 2008

(54) METHOD, SYSTEM AND PROGRAM FOR EXECUTING A QUERY HAVING A UNION OPERATOR

(75) Inventors: Bruce Gilbert Lindsay, San Jose, CA (US); Linqi Liu, Toronto (CA); Robert Paul Neugebauer, Stouffville (CA); Mir Hamid Pirahesh, San Jose, CA (US); David C. Sharpe, Oakville (CA); Nattavut Sutyanyong, Thornhill (CA); Calisto Paul Zuzarte, Pickering (CA)

(73) Assignee: International Business Machines Corporation, Armonk, NY (US)

( * ) Notice: Subject to any disclaimer, the term of this patent is extended or adjusted under 35 U.S.C. 154(b) by 424 days.

(21) Appl. No.: 10/982,337

(22) Filed: Nov. 5, 2004

(65) Prior Publication Data

US 2006/0101001 A1 May 11, 2006

(51) Int. Cl.
  *G06F 7/00* (2006.01)
  *G06F 17/00* (2006.01)
(52) U.S. Cl. .............................................. 707/3; 707/4
(58) Field of Classification Search ...................... 707/3
  See application file for complete search history.

(56) References Cited

U.S. PATENT DOCUMENTS

| | | | |
|---|---|---|---|
| 6,032,143 | A | 2/2000 | Leung et al. |
| 6,067,542 | A | 5/2000 | Carino, Jr. |
| 6,092,062 | A * | 7/2000 | Lohman et al. .................. 707/2 |
| 6,161,105 | A * | 12/2000 | Keighan et al. ............. 707/100 |
| 6,356,887 | B1 | 3/2002 | Berenson et al. |
| 7,120,623 | B2 * | 10/2006 | Ganesan et al. ................. 707/2 |

FOREIGN PATENT DOCUMENTS

WO   WO 02/061622 A2   8/2002

OTHER PUBLICATIONS

Calisto Zuzarte et al.: "Partitioning in DB2 Using the UNION ALL View," © Copyright International Business Machines Corporation 2002.

Ning An et al.: "Toward an Accurate Analysis of Range Queries on Spatial Data," IEEE Transactions on Knowledge and Data Engineering, vol. 15, No. 2, Mar./Apr. 2003.

(Continued)

*Primary Examiner*—Tony Mahmoudi
*Assistant Examiner*—Alex Gofman
(74) *Attorney, Agent, or Firm*—Sughrue Mion, PLLC

(57) ABSTRACT

Disclosed is a data processing system implemented method, a data processing system and an article of manufacture for executing a query having a union operator. The data processing system implemented method directs the data processing system to process a query against data objects. The data objects are operatively coupled to the data processing system. The query includes a parent operator. The parent operator references a union operator. The union operator references sub-queries. The sub-queries reference the data objects. The data processing system implemented method includes noting a set of partitionings for the union operator, the noted set of partitionings being based on the sub-queries and being based on the data objects reference by the sub-queries, and executing the query having the union operator, the execution of the query being based on the noted set of partitionings and the parent operator.

36 Claims, 7 Drawing Sheets

OTHER PUBLICATIONS

Disclosed anonymously: "Improving the Performance of Correlated Subqueries in SQL,", Research Disclosure No. 310117, Kenneth Mason Publications Ltd., England, ISSN 0374-4353, Feb. 17, 1990.

Jin Deog Kim et al.: "Estimation Methods of Selectivity for Spatial Query Optimization," Journal of KISS(B): Software and Applications, ISSN 1226-2285, vol. 25, No. 7, Jul. 1998.

Cesar A. Galindo-Legaria et al.: "Orthogonal Optimization of Subqueries and Aggregation," ACM SIGMOD, May 21-24, 2001, Santa Barbar, CA, USA.

* cited by examiner

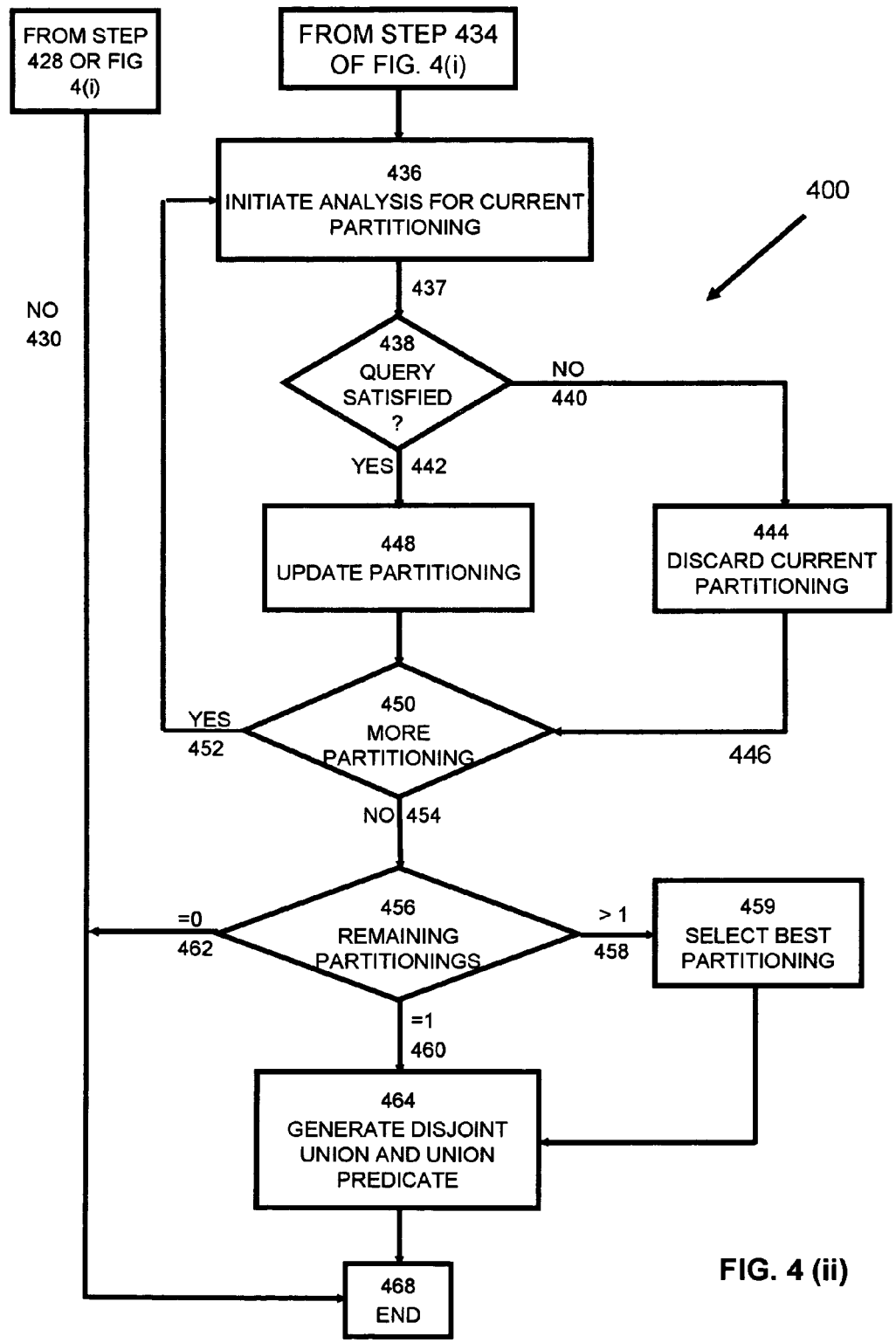
FIG. 4 (ii)

METHOD, SYSTEM AND PROGRAM FOR EXECUTING A QUERY HAVING A UNION OPERATOR

FIELD OF THE INVENTION

The present invention relates to database management systems in general, and more specifically, the present invention relates to a data processing system, a data processing system implemented method and an article of manufacture for executing a query having a UNION operator.

BACKGROUND

Database management systems (DBMSs) are used to organize and manage large amounts of information. The data stored in databases is normally structured into records with predetermined fields. These fields identify the information in the records, and are normally organized into tables having rows and columns such that a query may be executed by a DBMS and the DBMS may generate a query response having query-satisfying information retrieved from the row(s) and column(s) associated with the tables.

A DBMS is an executable program stored on a data processing system. As is known to those skilled in the art, such a data processing system may include different hardware and software combinations. Users may access tabled information stored within a database which is operatively coupled to the DBMS by way of a user interface using, for example, a structured query language (SQL) or an XQuery and the like.

A given query may be parsed and compiled by a compiler contained within the DBMS, and as a result of compiling the given query the DBMS generates executable code which may be used for retrieving query-satisfying data which may satisfy the requirements of the given query. Typically, the DBMS may include a user command processor for processing user commands, such as queries, and executing such user commands against the database. Data processing system usable medium may contain executable code for directing the DBMS to perform algorithms related to operations of the DBMS. The data processing system usable medium may also store the database.

One way to manipulate and access a data collection stored within the database is to use a query, such as an SQL query. SQL queries may be of varying structure and complexity. Many such queries however, are often structured to utilize query predicates which can not be evaluated until execution of the SQL query at runtime. A query predicate is generally known as an element of a search value that expresses or implies a comparison operation. In effect, a predicate specifies a condition about a row of data or group of data to be manipulated by an SQL query.

With SQL queries, a UNION operator and/or a UNION ALL operator specifies which data is to be retrieved from multiple independent sub-queries and presents a consistent set of columns and data-types to a parent operation of the SQL query. One usage of the UNION operator and/or the UNION ALL operator is to combine together a large data set that has been divided into multiple smaller tables for a number of reasons including: limitations in the amount of data that can be stored in a single table; enhancing performance through reduced lock contention, disk performance, index utility and others; combining results from statistical calculations; and others. The UNION operator and/or the UNION ALL operator may be used in the query to allow the parent operation to operate on a singular data object (i.e., a base table) even though data from multiple sub-queries and data objects may be retrieved.

Operators in a query language typically have one or more sources of input. When the UNION operator and/or the UNION ALL operator is present in a query, it is typically one of the inputs to at least one valid operator in the query language. We refer to each of those operators which receive input from the UNION operator and/or the UNION ALL operator as the parent operation. The specifics of the query language will determine what operators are valid as parent operators and what operation the parent operators will perform.

The nature of the UNION operator and/or the UNION ALL operator hides many properties of the underlying sub-queries from the parent operations including order, indexing, functional dependencies and column properties. Since these properties are unavailable to the parent operation, this lack of information may prevent the generation of an optimal access plan and may result in unnecessary work by the DBMS.

A known method of directing the DBMS to process the UNION operator and/or the UNION ALL operator contained in the SQL query is to process each of their sub-queries to produce their individual query results, and then combine those query results in a manner dictated by the UNION operator and/or the UNION ALL operator, and then flow the combined result to the parent operation. This approach may be problematic because of poor performance resulting from unnecessary evaluation of sub-queries, and because of poor performance of an access plan which may not use an optimal access method for the data objects.

Another known method of processing such operators is implemented outside of the DBMS by a controlling application in which the controlling application determines which data objects need to be operated thereon and instructing the DBMS on which data objects to access and in which manner. This approach requires a great deal of complexity in the controlling application which makes the controlling application more difficult to develop and maintain. It also defeats the purpose of the UNION operator and/or the UNION ALL operator, which hides the underlying structure from the controlling application, since the controlling application must now know the specification of the database design associated with the database.

Another known method to improve performance of queries against the UNION ALL operators is discussed a paper entitled "*Partitioning in DB2 using UNION ALL View*", February 2002, DB2 Developer Domain. However, this paper does not address problems identified above because they may still cause unnecessary evaluation of sub-queries of the UNION operator and/or the UNION ALL operator when the parent operator uses a variable whose value cannot be instantiated before the execution of the query.

There is a need for a data processing system, a data processing system implemented method and an article of manufacture for executing a query having a UNION operator.

SUMMARY

In a first aspect, the present invention provides a data processing system implemented method of directing a data processing system to process a query against data objects, the data objects being operatively coupled to the data processing system, the query including a parent operator, the parent operator referencing a union operator, the union operator referencing sub-queries, the sub-queries referencing the data objects, the data processing system implemented method including: noting a set of partitionings for the union operator, the noted set of partitionings being based on the sub-queries and being based on the data objects reference by the sub-queries, and executing the query having the union operator, the execution of the query being based on the noted set of partitionings and the parent operator.

In a second aspect, the present invention provides a data processing system for processing a query against data objects, the data objects being operatively coupled to the data processing system, the query including a parent operator, the parent operator referencing a union operator, the union operator referencing sub-queries, the sub-queries referencing the data objects, the data processing system including: a noting module for noting a set of partitionings for the union operator, the noted set of partitionings being based on the sub-queries and being based on the data objects reference by the sub-queries, and an executing module for executing the query having the union operator, the execution of the query being based on the noted set of partitionings and the parent operator.

In a third aspect, the present invention provides an article of manufacture for directing a data processing system to process a query against data objects, the data objects being operatively coupled to the data processing system, the query including a parent operator, the parent operator referencing a union operator, the union operator referencing sub-queries, the sub-queries referencing the data objects, the article of manufacture including a program usable medium embodying one or more instructions executable by the data processing system, the one or more instructions including: data processing system executable instructions for noting a set of partitionings for the union operator, the noted set of partitionings being based on the sub-queries and being based on the data objects reference by the sub-queries, and data processing system executable instructions for executing the query having the union operator, the execution of the query being based on the noted set of partitionings and the parent operator.

BRIEF DESCRIPTION OF THE DRAWINGS

Aspects of the present invention will become more apparent from the following description of the embodiments thereof and the accompanying drawings which illustrate, by way of example, the embodiments of the present invention; in the drawings like elements feature like reference numerals and wherein individual elements bear unique alphabetical suffixes:

FIGS. 4(i) and 4(ii) collectively show a flow chart illustrating a routine for predetermination of sub-query relevance for the database management system of FIG. 1.

DETAILED DESCRIPTION

Figure 1:
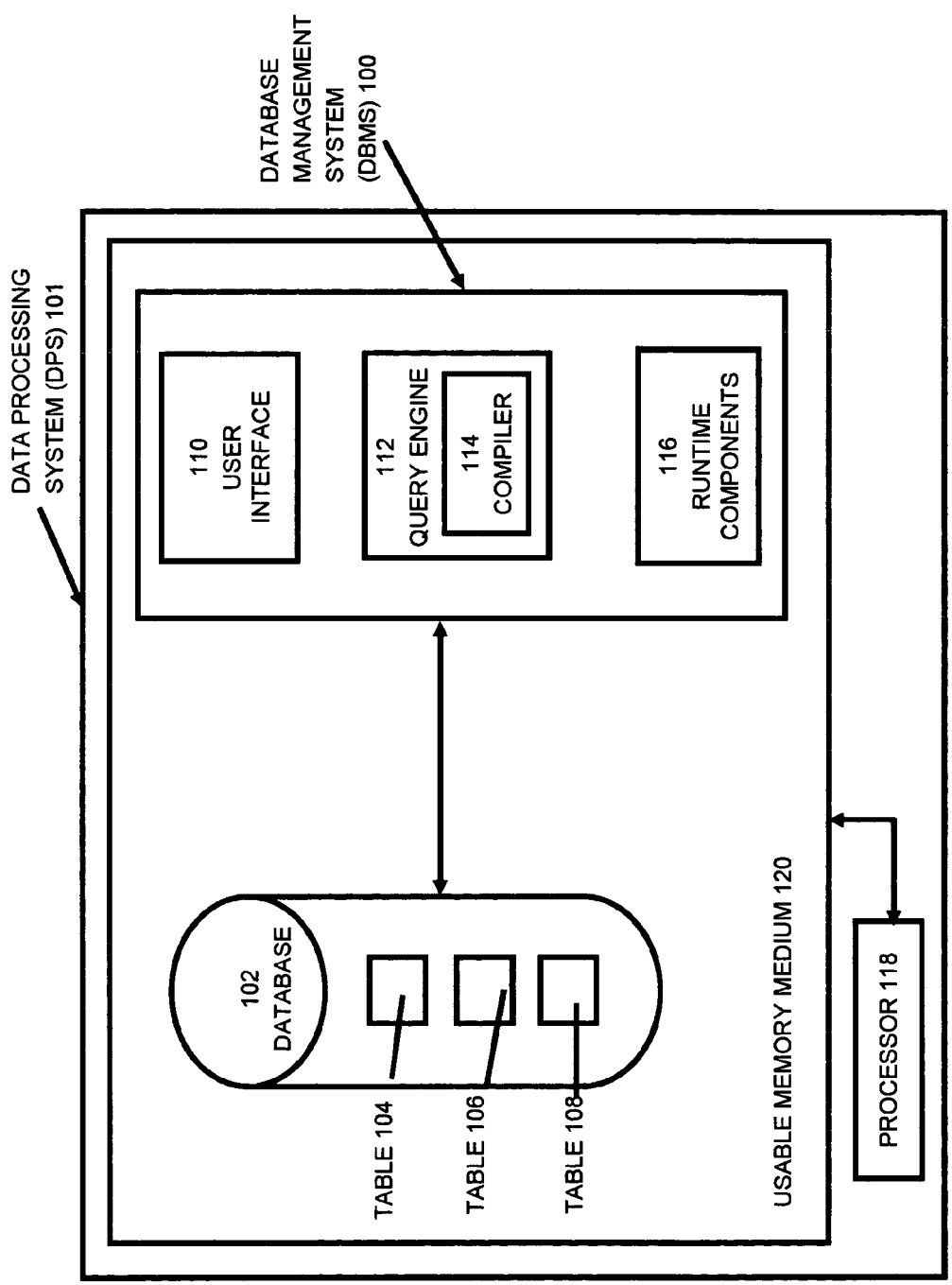
FIG. 1 shows a block diagram of a database management system.

The description which follows, and the embodiments described therein, is provided by way of illustration of an example, or examples, of particular embodiments of the principles of the present invention. These examples are provided for the purposes of explanation, and not limitation, of those principles and of the invention. In the description, which follows, like parts are marked throughout the specification and the drawings with the same respective reference numerals.

The following detailed description of the embodiments of the present invention does not limit the implementation of the present invention to any particular data processing system programming language. The present invention may be implemented in any data processing system programming language provided that the OS (Operating System) provides the facilities that may support the requirements of the embodiments of the present invention. Any limitations presented may be quite likely a result of a particular type of OS, data processing system programming language, or data processing system and may not be a limitation of the embodiment of the present invention.

FIG. 1 shows a DBMS 100. The DBMS 100 is implemented as data processing system executable code stored in usable memory medium which is operatively coupled to the a data processing system (DPS) 101. Operatively coupled to the DBMS 100 is a database 102 which is also stored in the usable memory 120 associated with the DPS 101. The DPS 101 also includes a processor 118 which is operatively coupled to the usable memory medium 120. The processor 118 executes the data processing system executable code associated with the DBMS 100 and thereby achieves desired operational performance of the DBMS 100.

The DBMS 100 includes a user interface 110 which provides an access point for a user of the DBMS 100 by which the user may enter database queries (for example, SQL or XQuery queries) against information stored in the database 102. The user interface 110 may further provide an interface for providing information requested in the query to a user of the DBMS 100.

The DBMS 100 may also include a query engine 112 and runtime components 116. The query engine 112 is for processing commands received through the user interface 110, typically in the form of SQL or XQuery statements. The query engine 112 may include a compiler 114. The compiler 114 may translate query statements from the user interface 110 into data processing system usable code so that the DPS 101 in which the DBMS 100 is implemented may act or operate upon the queries. Such DPS usable instructions or code may be generated as the runtime components 116 which may then be issued against the database 102.

The processor 118 may be used, among other things, for processing the runtime components 116 and other functions of the DBMS 100.

The query engine 112 may also be responsible for optimizing the queries and generating an access plan for each such query which are then used to access the database 102.

An information collection stored within the database 102 may be organized into tables such as a table 104, a table 106, and a table 108, so that the information may be organized in a logical manner, or to simply divide large amounts of data into smaller data objects. Information fields in the tables 104, 106 and 108 may be further organized by rows and columns. In general, data in the database 102 may be organized into data structures including rows that are indexable along one or more columns. Depending on an organization of a collection of data within database 102, it is possible for data to be duplicated within fields of different tables, such as the tables 104, 106 or 108.

When a SQL (or a XQuery) query is issued against the DBMS 100, the query engine 112 provides an optimization function whereby SQL queries are optimized for execution in the DBMS 100 based on information known to the query engine 112. However, many SQL queries are structured with predicates that utilize data variables with values that are not known until execution of the query at runtime.

The medium 120 may include hardware, software or a combination thereof such as, for example, magnetic disks, magnetic tape, optically readable medium, semi-conductor memory, or random access memory (RAM) and the like without restriction. Furthermore the DBMS may be organized in a standalone model whereby the DBMS may be operated by a single data processing system, or may be operated in a distributed manner over a plurality of network-coupled data processing systems. Also the DBMS may be operated under a client-server model whereby one or more data processing systems that act as servers which store the database, and one or more data processing systems that act as clients which operates the DBMS. The DBMS may be operated in any combination of the above-mentioned configurations.

Figure 2:
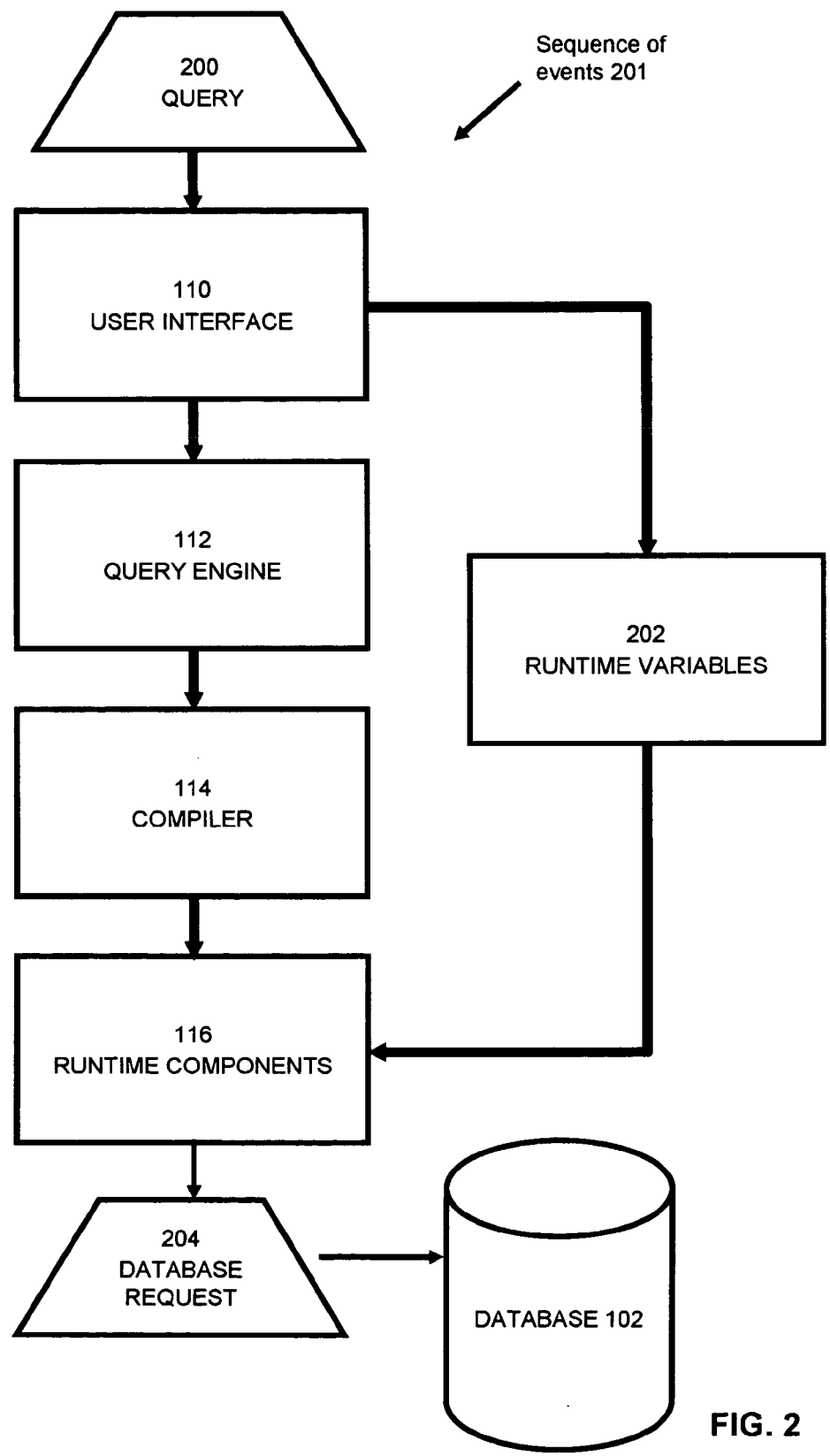
FIG. 2 shows a flow chart showing execution of an SQL query executed by the database management system of FIG. 1.

FIG. 2 shows a sequence of events 201 following an issuance of a query 200 on the DBMS 100. After the query 200 is received by the user interface 110, the query 200 is passed to the query engine 112 for query optimization. The optimized query (not depicted) provides or generates an access plan (not depicted) that is then compiled by the compiler 114 to generate the runtime components 116. The runtime components 116 are readable by the processor 118. As the query 200 is being executed, i.e. at runtime, any data values for data variables and predicates required by the query 200 (such as, for example, the value of a host variable) would be retrieved by the processor 118 from runtime variables 202 and incorporated into the runtime components 116 by processor 118 to generate a database request 204. The database request 204 may then access the contents of the database 102 and execute the query 200 against the contents or information stored within the database 102.

The embodiment optimizes execution of operations such as the UNION operator and/or the UNION ALL operator contained in the query 200. These operators allow data to be retrieved from multiple independent sub-queries or data objects, such as tables, and return a consistent set of data through the operation to a main, or parent query. For example, the UNION operator and/or the UNION ALL operator may be used in conjunction with a CREATE VIEW query operator to generate a view of different data objects, such as different tables, which are glued together to appear as a single, consistent data object that may then be manipulated by further query operators. For example, a query statement:

create view X as (select * from "table 104" UNION ALL select * from "table 106");

would create a logical view entitled "X" which includes all the data records from the tables 104 and 106. The logical view "X" may then itself be operated upon by SQL queries as if it were a data object of database 102. The UNION operator differs from the UNION ALL operator in that the UNION operator eliminates duplicate entries on the data which is returned from the operation, while the UNION ALL operator does not eliminate duplicates and returns all data entries.

The nature of the UNION operator and/or the UNION ALL operator is that many properties of the underlying sub-queries or data objects on which the UNION operator and/or the UNION ALL operator operates are hidden from the parent operator. For example, in the view "X" created above by the query statement:

create view X as (select * from "table 104" UNION ALL select * from "table 106");

If an SQL query is executed against the view "X", such as:

select * from X;

then in the above query, the view "X" appears as if it is a single data object to the SELECT operator, even though the data produced by the view "X" is generated by a number of sub-queries comprising SELECT operations on different data objects (in this case, tables 104 and 106).

Consider if, for example, the tables 104, 106 and 108 contain information about the stock of inventory available to a firm. In this example, each of the tables 104, 106, and 108 contains a data field referred to as warehouse_id, which identifies with an integer number a particular warehouse where a particular item of stock is located, and each table is restricted to contain a limited range of warehouse_id's.

Figure 3:
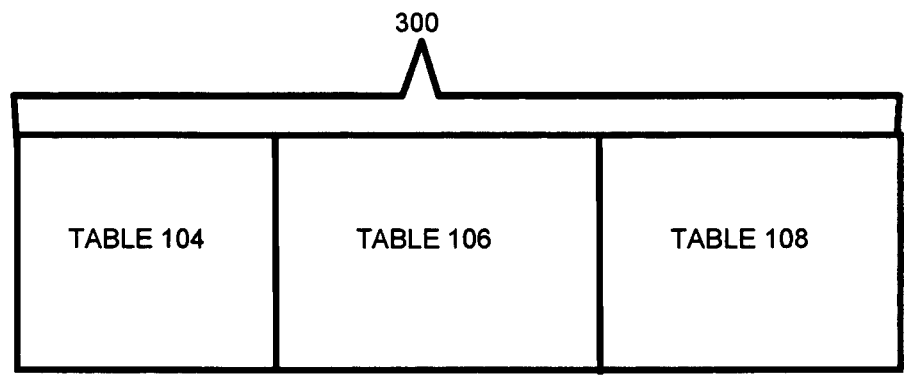
FIG. 3 shows a graphical representation of tables being combined by a UNION ALL operator by the database management system of FIG. 1.

FIG. 3 shows an example graphical representation of a combination of tables 104, 106 and 108 along the warehouse_id dimension that may cover an entire range of warehouse_id's. Now, if the SQL operator CREATE VIEW is used to create a view entitled "stock":

create view STOCK as (select * from "table 104" UNION ALL select * from "table 106" UNION ALL select * from "table 108");

And then, if a parent query is executed against database 102:

select * from STOCK;

then a query optimizer (not depicted) associated with the query engine 112 could process the query by first having the UNION ALL operator access the underlying data objects contained in tables 104, 106 and 108 to first retrieve all the data in each of tables 104, 106, and 108, combine such data into a single, consistent data object, and then having the parent SELECT operator issued against the combined data from the underlying data objects.

Figure 3A:
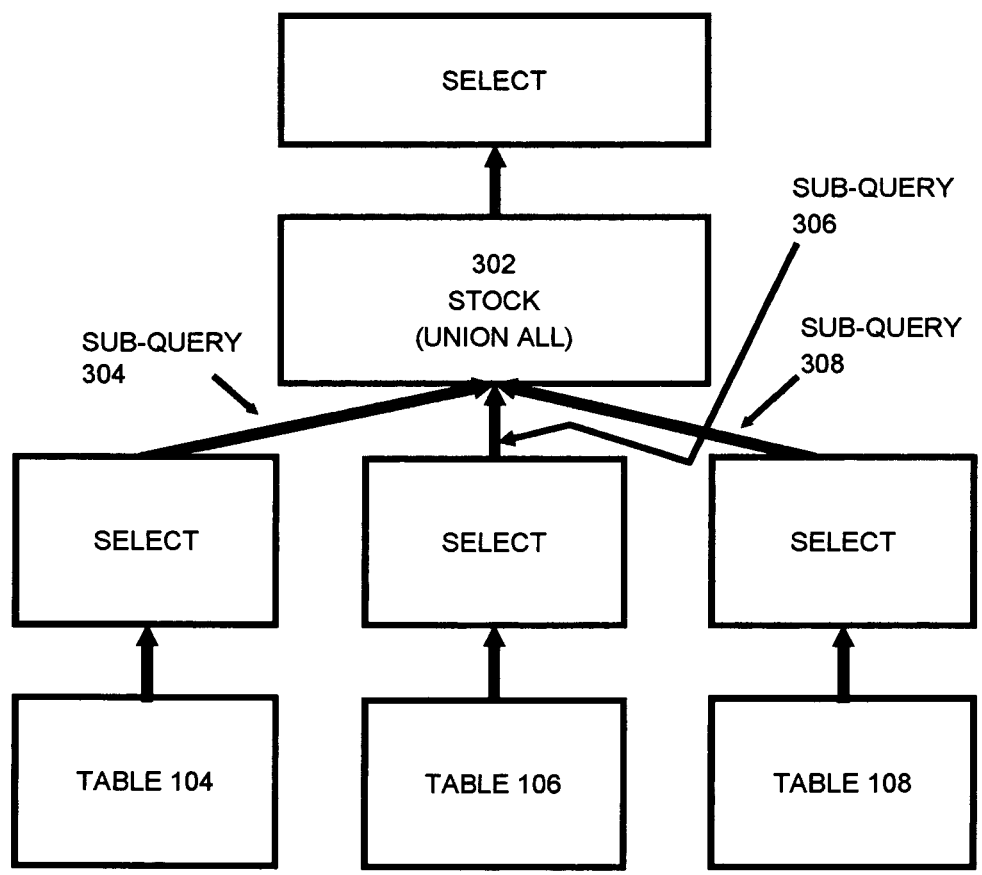
FIG. 3A shows a graphical representation of data flow of a select SQL query issued against the UNION ALL operator of FIG. 3.

In FIG. 3A, each operand of the UNION ALL operator, shown as a sub-query 304, a sub-query 306 and a sub-query 308, are referred to as sub-queries of the UNION ALL operator. Sub-queries of the UNION operator and/or the UNION ALL operator may contain any sequence of operations that are valid in the query language and may operate on any number of data objects.

Figure 3B:
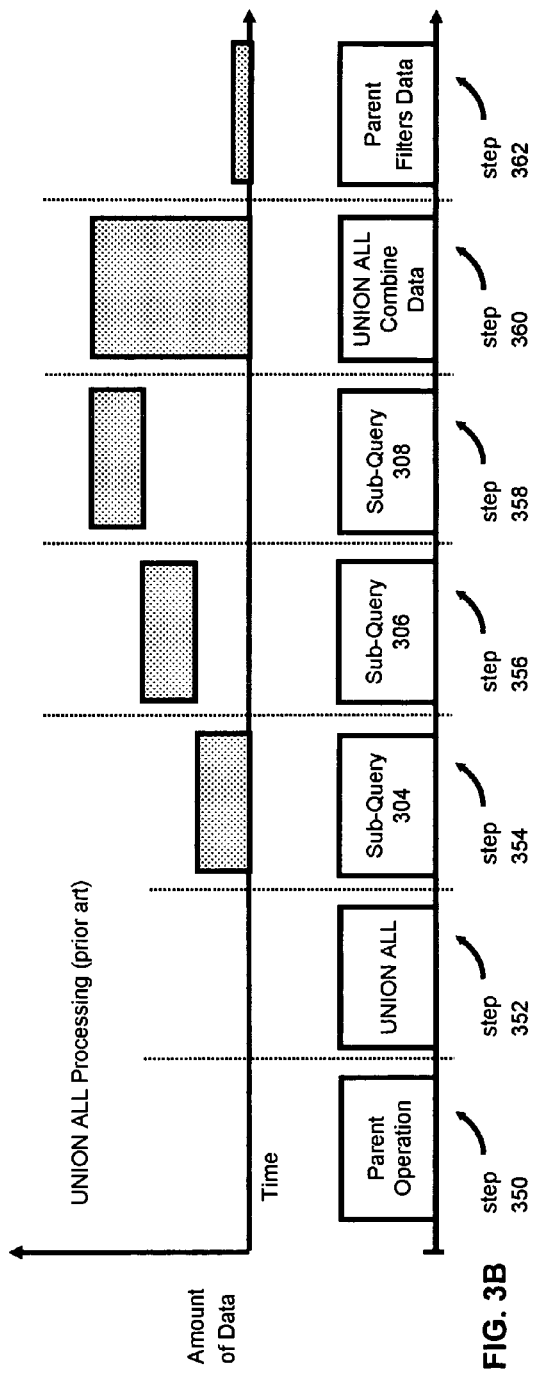
FIG. 3B shows a graphical representation of the execution of a UNION ALL operator using a prior art method of execution for the query represented in FIG. 3A.

FIG. 3B shows a time and data chart associated with a known processing method of processing a UNION ALL operator. It is apparent that the known method may require a significant amount of processing time and many steps may need to be executed in order to retrieve the query-satisfying data from the database 102. By way of summary, the following describes the steps used in the known method.

In step 350, the parent operation of the UNION ALL operator in the query is invoked to perform its processing, which causes the UNION ALL operator to be invoked to produce the input for the parent operation.

In step 352, the UNION ALL operator is invoked to provide data to the parent operation from step 350. The UNION ALL operator must then invoke each of its input sub-queries 304, 306 and 308 from FIG. 3A.

In step 354, the sub-query 304 is invoked. It will access any required data objects of a DBMS, perform the specified operations on those data objects, and return results to the UNION ALL operator.

In step 356, sub-query 306 is invoked. It will access any required data objects of the DBMS, perform the specified operations on those data objects and return results to the UNION ALL operator.

In step 358, sub-query 308 is invoked. It will access any required data objects of the DBMS, perform the specified operations on those data objects and return results to the UNION ALL operator.

In step 360, all input sub-queries of the UNION ALL operator have produced data. The UNION ALL operator will then combine the data and return that data to its parent operation. If the UNION ALL operator was a UNION operator duplicate elimination would need to be performed.

In step 362, the parent operation is able to process its input data and will perform the operations and filtering of the data that is specified in the query.

Figure 3C:
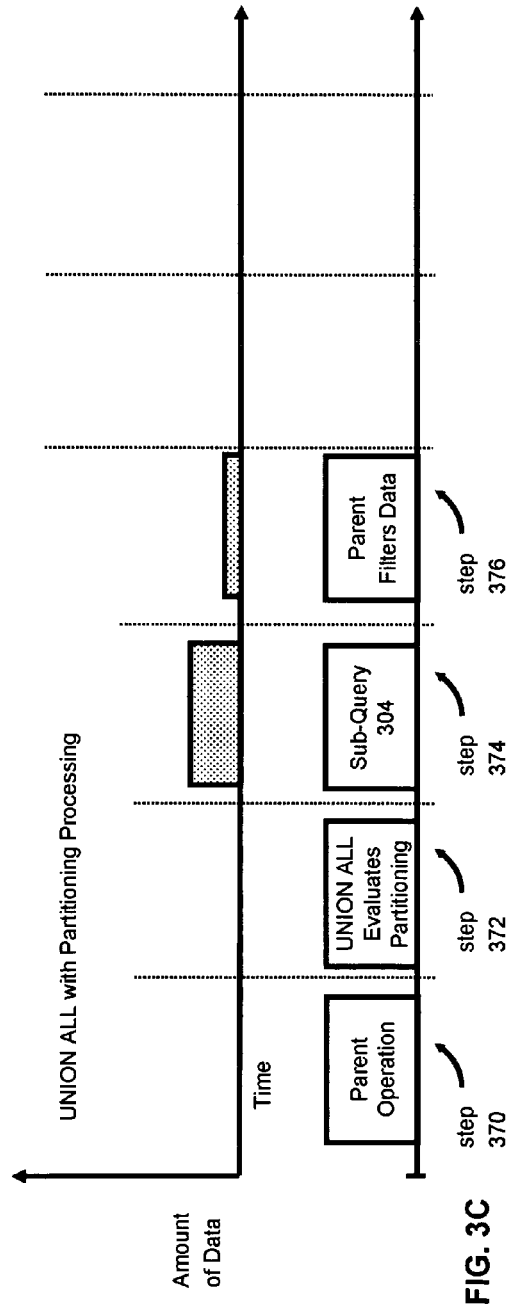
FIG. 3C shows a graphical representation of the execution of a UNION ALL operator using the embodiment described below for the query represented in FIG. 3A.

FIG. 3C shows a time and data chart of processing the UNION ALL operator by using an embodiment which is described further below in greater details. By way of summary, the following describes the steps used in the known method.

In step 370, the parent operation of the UNION ALL operator in the query is invoked to perform its processing. This will cause the UNION ALL operator to be invoked to produce the input for the parent operation.

In step 372, the UNION ALL operator evaluates the partitioning to determine that only sub-query 304 will provide data relevant to the query.

In step 374, sub-query 304 is invoked. It will access any required data objects of the DBMS, perform the specified operations on those data objects and return results to the parent operations of the UNION ALL operator. If the UNION ALL operator was a UNION operator duplicate elimination would need to be performed.

In step 376, the parent operation is able to process its input data and will perform the operations and filtering of the data that is specified in the query.

Since properties of underlying data objects are hidden from the parent operation through the UNION operator and/or the UNION ALL operator, execution of the parent operation may not be fully optimized by the query optimizer in certain situations. For example, if the above query was limited to retrieving records for a specific warehouse as identified by an integer variable :int_var with the value 1 in the warehouse_id field, such as:

select * from STOCK where warehouse_id=:int_var;

then the query optimizer may request that data to be retrieved from tables 104, 106 and 108 by each sub-query 304, 306 and 308 respectively. The UNION ALL operator then combines the retrieved data and the parent operator filters it so that only data from row(s) identified by the variable :int_var in the column warehouse_id is returned. This may occur because the variable :int_var will not be instantiated until runtime of the query and therefore, at the time of optimization it cannot be determined that only data from a particular subset of the data objects referred to by the UNION ALL operator is required.

As such, it may be advantageous to have a query engine with further optimization capabilities in relation to the UNION operator and/or the UNION ALL operator.

The embodiment further provides a routine for performing an analysis of the UNION operator and/or the UNION ALL operator along with its input sub-queries prior to runtime execution of the query. The result of the analysis allows the DBMS to determine which sub-queries of the UNION operator and/or the UNION ALL operator will provide relevant data to the query when execution actually occurs and enables the DBMS to avoid the execution of the irrelevant sub-queries.

One aspect of the embodiment provides analysis of sub-query relevance while the query is being compiled by the query engine 112. Pre-determination of sub-query relevance provides a system and method for determining, prior to execution at run time, which sub-queries of the UNION operator and/or the UNION ALL operator will provide data relevant to a parent query operating upon the UNION operator and/or the UNION ALL operator. Pre-determination of sub-query relevance depends upon information maintained by the DBMS 100 regarding the database 102 and the data objects stored within the database 102. This set of information, referred to as "database schema" and "database statistics", can be accessed from the catalog of the data processing system by the query engine 112 to perform query optimization. Database schema information may include restrictions on the data in each of data objects, columns and data types of those columns for the data objects in the database 102, indexes on data objects in the database. Database statistics may include information regarding access statistics for each table, size information, frequent value counts, distinct value counts and other performance tuning information. Other statistics may relate to attributes of tablespaces, tables, columns, indexes, views and others.

Pre-determination of sub-query relevance makes use of database schema and database statistics stored within a DBMS to "pre-determine", prior to runtime execution of queries, whether sub-queries of the UNION operator and/or the UNION ALL operator are relevant to the parent query. Pre-determination of sub-query relevanceis divided into the following three broad steps:

The first step infers what data is available from each sub-query of the UNION operator and/or the UNION ALL operator through an evaluation of the constraints, functional dependencies and keys relating to the data objects referenced by each sub-query and the predicates and expressions of each sub-query. This is done by identifying relationships amongst the data restrictions on the columns between each sub-query. The inferring of what data is available is performed by assessing whether the sub-queries of the UNION operator and/or the UNION ALL operator are partitioned by a set of columns, that is, the step determines whether the data objects involved in the sub-queries of the UNION operator and/or the UNION ALL operator can be "partitioned" on the basis of one or more partitioning columns, as explained in detail below.

The second step determines whether the parent query is only going to access a specific subset of the sub-queries making up the UNION operator and/or the UNION ALL operator. This involves an analysis of the parent operations and the partitionings that were determined in the first step.

The third step relates to the runtime execution of the parent operations and the UNION operator and/or the UNION ALL operator. Upon invocation of the UNION operator by the parent operation, the variables that were not available during the first two steps have been instantiated. The UNION operator and/or the UNION ALL operator will then determine the sub-queries that will provide data to the query using these variables combined with the determined partitionings; and these relevant sub-queries may then be executed.

It should be noted that the first and second steps of pre-determination of sub-query relevance are evaluative steps, and that if suitable partitioning columns cannot be found or that a parent query in question does not access a determinable subset of partitions, then optimization by pre-determination of sub-query relevance may not yield a superior access plan for that particular parent query. In such a case, the query engine 112 would simply perform its usual processing of the query without regard to pre-determination of sub-query relevance. Further details on the three steps involved in pre-determination of sub-query relevance are provided below. While the following description focuses on the UNION ALL operator, it will be appreciated that the description is equally applicable to the UNION operator.

Figure 4I:
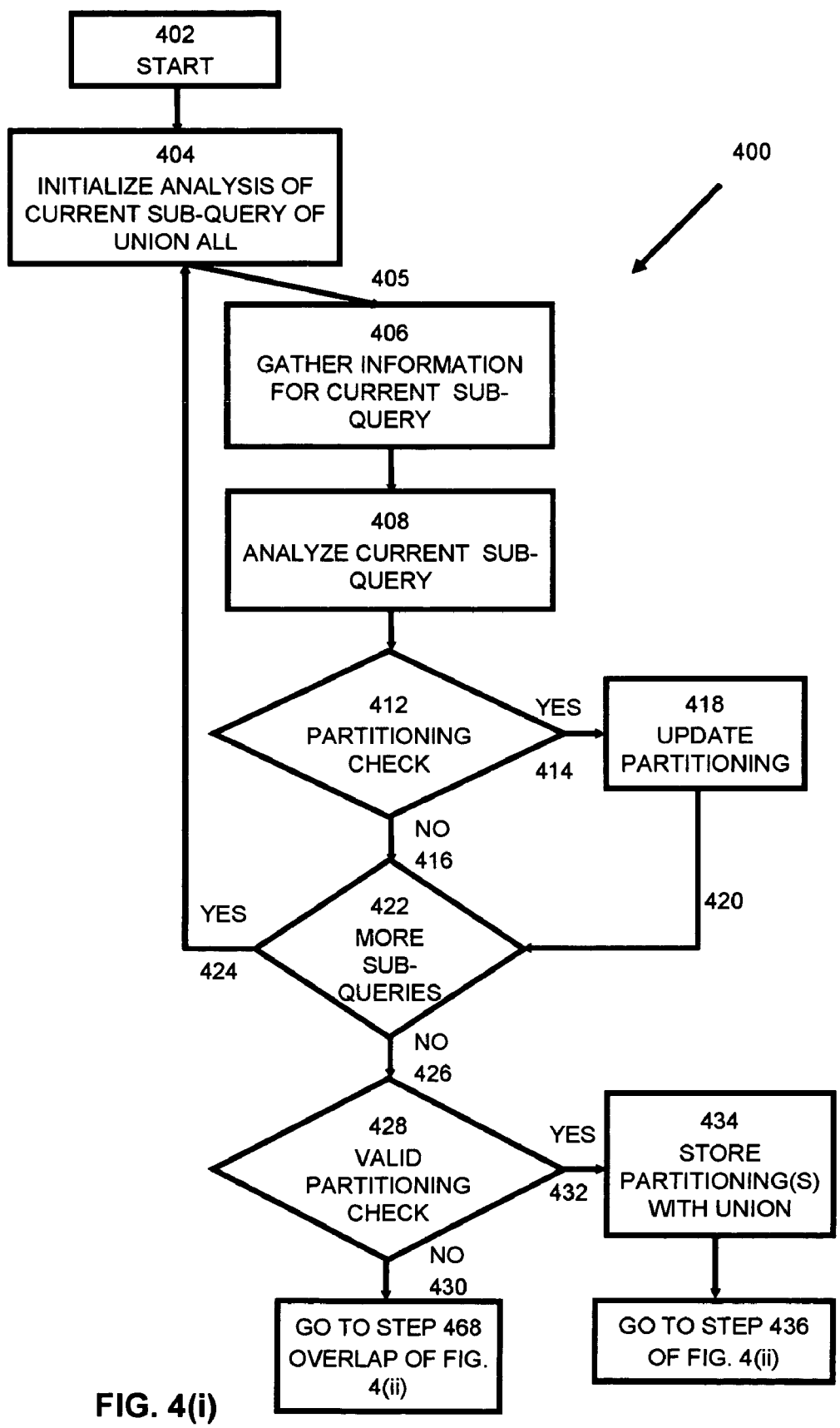

FIGS. 4(i) and 4(ii) show an exemplary implementation of a routine for predetermining sub-query relevance in the query engine 112. The implementation is shown as flow chart 400. The routine for predetermining (a.k.a. predetermination of) sub-query relevance may be implemented as a data processing system executable code stored in a usable medium which may be implemented as hardware components, software components, or a combination of both hardware and software components associated with the DBMS 100.

After the start of the routine at step 402, a program loop is generated to analyze each sub-query of the UNION ALL operator at step 404. For each sub-query, path 405 is taken to iteratively determine one or more partitioning columns of the UNION ALL operator. As discussed above, pre-determination of sub-query relevance has three steps, and step 404 begins the first step of partitioning proving.

In this first step, for each sub-query of the UNION ALL operator, path 405 is taken to step 406 whereby the information regarding the current sub-query is collected. Information to be collected may be obtained from the database schema and statistics stored in the catalog of the DBMS and by analyzing the predicates in the sub-query. Such information includes all constraints, functional dependencies, and keys relating to the data objects of the sub-query and the predicates and expressions relating to the sub-query.

Then in step 408, the table constraint and query predicate information gathered from step 406 is analyzed to determine the data boundaries of the sub-query being analyzed. This analysis may be performed by way of a multi-dimension value graph whereby each dimension represents one column of a data object being accessed by the sub-query; any other suitable data structures may also be used. The constraints, predicates and expressions are marked on the value graph along values demarcated by those data restrictions along each defined dimension. The keys and functional dependencies are then combined with the demarcations already present in the graph to create new demarcations.

Then at step 412, a check for potential partition columns is performed among the sub-queries that were previously analyzed and the sub-query that has just been analyzed at step 408. The purpose of the check at step 412 is to determine a partitioning column, or a set of partitioning columns, that spans the data objects that are referenced by each of the sub-queries that have been evaluated thus far. In evaluating whether a set of column are partitioning columns, the multi-dimensional value graphs that were generated for each sub-query of the UNION ALL operator is analyzed to determine if one or more columns can identify every region demarcated by the data restrictions of all the sub-queries in the value graph. If a column or the minimal combination of columns can do so, then such a column or columns can be identified as partitioning columns. The partitioning columns combined with demarcations and annotations from the value graph are referred to as a partitioning. A UNION ALL operator may contain several sets of independent partitioning as described in the examples below.

If the sub-query just analyzed is the first sub-query of the UNION ALL operator to be analyzed, then any column could be a potential partitioning column. Thereafter, path 416 is taken to step 422 where it is determined if there are further sub-queries to analyze.

If further sub-queries are to be analyzed, path 424 is taken to return to step 404 to begin analysis of a further sub-query. If not, then path 426 is taken from step 422 to exit the program loop initiated at step 404.

If, however, the sub-query just analyzed at steps 408 and 412 was not the first sub-query of the UNION ALL operator the method must examine the partitioning(s) that were previously determined to ensure that they are still valid. If it was determined that the previously determined partitioning(s) are not valid at step 412, then path 414 is taken to step 418 to determine a new set of partitionings. At this point, the partitioning column(s) and partitioning(s) which are valid over all analyzed sub-queries are also updated to reflect the new regions in the value graph that were found in step 412.

Thereafter, path 420 is taken to step 422 to evaluate if further sub-queries are to be evaluated as explained above. However, if no overlaps were found at step 412, then path 416 is taken to step 422, to evaluate if further sub-queries are to be evaluated, as described above.

It will be appreciated that by iteratively updating the information relating to partitioning column(s) and partitioning(s) after each sub-query of the UNION ALL operator has been examined as described above, either one, or one or more partitioning columns and partitions that are valid for the UNION ALL operator would have been identified.

At step 428 it is determined if one or more groups of partitioning column(s) exist for some subset of the sub-queries during the first broad step of partition proving in the pre-determination of sub-query relevance. If so, then path 432 is taken to step 434 to associate each valid partitioning with the UNION ALL operator, and then the routine proceeds to step 436 to begin the second broad step in pre-determination of sub-query relevance. If, however, no valid partitions are found to be remaining after step 428, then path 430 is taken to end the pre-determination of sub-query relevance routine, as it has been determined that the sub-queries of the particular UNION ALL operator under analysis do not allow for optimization by the present invention. Preferably, sub-queries should not overlap in the combination of the dimensions of the partitioning for that partitioning to be most useful.

Figure 5:
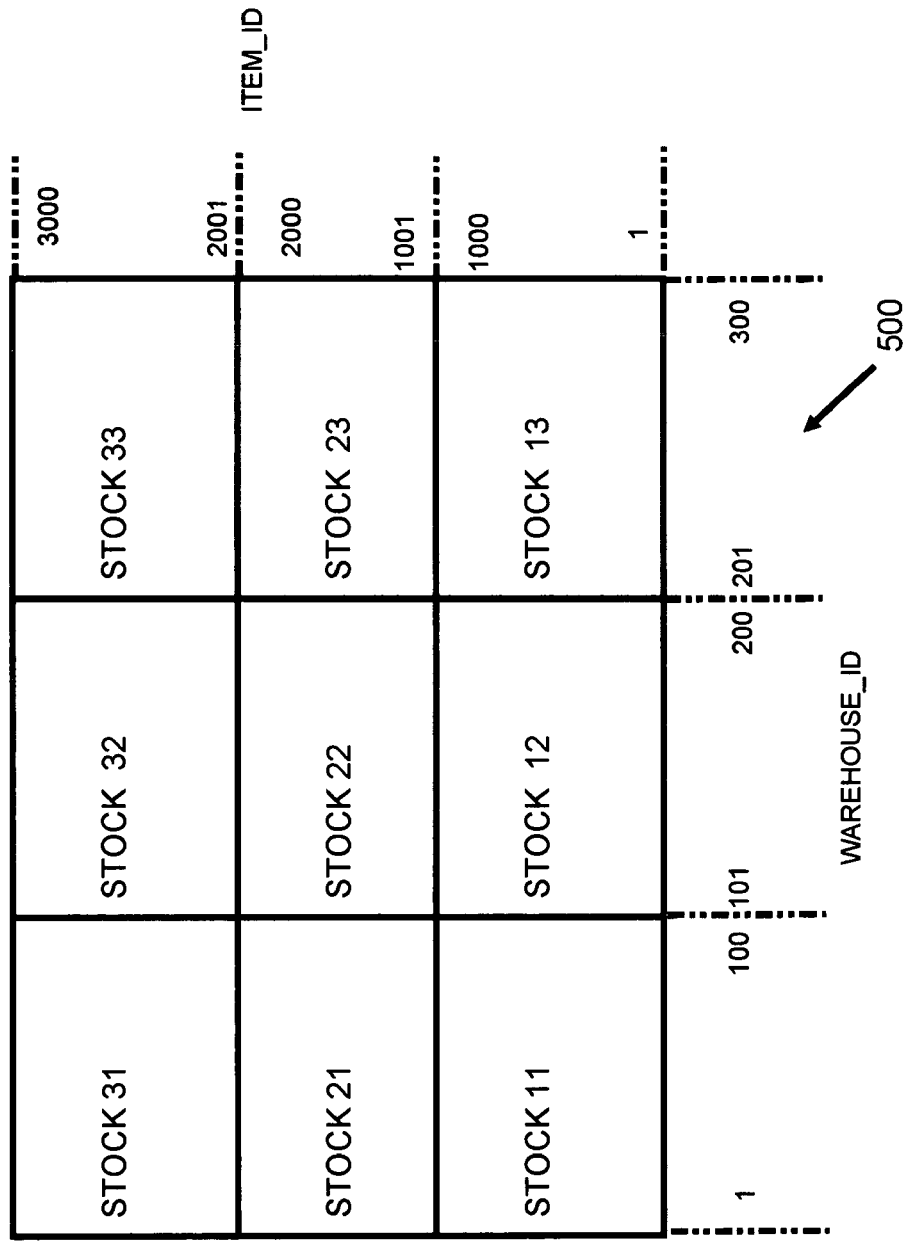
FIG. 5 shows a graphical representation of a relation between data objects in a database associated with the database management system of FIG. 1.

The above selection of partitioning columns can be illustrated by way of some simple examples. Referring to FIG. 5, consider the following simple two dimensional stock database created with the following sample SQL statements:

| | |
|---|---|
| create table STOCK11 | (warehouse_id integer, item_id integer, num_in_stock integer, num_on_order integer); |
| create table STOCK12 | (warehouse_id integer, item_id integer, num_in_stock integer, num_on_order integer); |
| create table STOCK13 | (warehouse_id integer, item_id integer, num_in_stock integer, num_on_order integer); |
| create table STOCK21 | (warehouse_id integer, item_id integer, |

```
                                    num_in_stock integer,
                                    num_on_order integer);
create table STOCK22                (warehouse_id integer,
                                    item_id integer,
                                    num_in_stock integer,
                                    num_on_order integer);
create table STOCK23                (warehouse_id integer,
                                    item_id integer,
                                    num_in_stock integer,
                                    num_on_order integer);
create table STOCK31                (warehouse_id integer,
                                    item_id integer,
                                    num_in_stock integer,
                                    num_on_order integer);
create table STOCK32                (warehouse_id integer,
                                    item_id integer,
                                    num_in_stock integer,
                                    num_on_order integer);
create table STOCK33                (warehouse_id integer,
                                    item_id integer,
                                    num_in_stock integer,
                                    num_on_order integer);
alter table STOCK11 add constraint
    wh_chk check (warehouse_id between 1 and 100);
alter table STOCK21 add constraint
    wh_chk check (warehouse_id between 1 and 100);
alter table STOCK31 add constraint
    wh_chk check (warehouse_id between 1 and 100);
alter table STOCK12 add constraint
    wh_chk check (warehouse_id between 101 and 200);
alter table STOCK22 add constraint
    wh_chk check (warehouse_id between 101 and 200);
alter table STOCK32 add constraint
    wh_chk check (warehouse_id between 101 and 200);
alter table STOCK13 add constraint
    wh_chk check (warehouse_id between 201 and 300);
alter table STOCK23 add constraint
    wh_chk check (warehouse_id between 201 and 300);
alter table STOCK33 add constraint
    wh_chk check (warehouse_id between 201 and 300);
alter table STOCK11 add constraint
    item_chk check (item_id between 1 and 1000);
alter table STOCK12 add constraint
    item_chk check (item_id between 1 and 1000);
alter table STOCK13 add constraint
    item_chk check (item_id between 1 and 1000);
alter table STOCK21 add constraint
    item_chk check (item_id between 1001 and 2000);
alter table STOCK22 add constraint
    item_chk check (item_id between 1001 and 2000);
alter table STOCK23 add constraint
    item_chk check (item_id between 1001 and 2000);
alter table STOCK31 add constraint
    item_chk check (item_id between 2001 and 3000);
alter table STOCK32 add constraint
    item_chk check (item_id between 2001 and 3000);
alter table STOCK33 add constraint
    item_chk check (item_id between 2001 and 3000);
```

From the above SQL query statements, a number of tables will be generated in the exemplary database with a graphical representation as shown on graph 500 in FIG. 5, whereby data range constraints for each table generated is shown along the horizontal and vertical axes of graph 500.

EXAMPLE 1

The case when the object STOCK is the UNION ALL operator of the base tables STOCK11, STOCK12, AND STOCK13. The SQL statement below shows how to define the object STOCK.

```
create view STOCK as select * from STOCK11
    UNION ALL
    select * from STOCK12
    UNION ALL
    select * from STOCK13;
```

With reference to steps 404 to 428 of flow chart 400 described above, it can be determined that warehouse_id is a partitioning column of the STOCK UNION ALL, because the data of tables STOCK11, STOCK12, and STOCK 13 is not overlapping along the dimension warehouse_id. Conversely, item_id is not a useful partitioning column of the STOCK UNION ALL because the each of the tables has the same range of valid values for that column and so would not aid the DBMS in preventing execution of sub-queries. The other columns of STOCK11, STOCK12 and STOCK13 are also not useful partitioning columns because they don't have any restrictions on the data in those columns.

EXAMPLE 2

The case when the object STOCK is the UNION ALL operator of the base tables STOCK11 and STOCK22. The SQL statement below shows how to define the object STOCK:

```
create view STOCK as select * from STOCK11
    UNION ALL
    select * from STOCK22;
```

Again with reference to steps 404 to 428, the embodiment determines that both warehouse_id and item_id are each independent partitioning columns. This is because either warehouse_id or item_id can determine the qualified sub-query of STOCK, that is, there is no overlap along either of those two dimensions.

EXAMPLE 3

The case when the object STOCK is a UNION ALL of the base tables STOCK11 to STOCK13, STOCK21 to STOCK23, and STOCK31 to STOCK33. The SQL statement below shows how to define the object STOCK:

create view STOCK as
    select 1 as branch, warehouse_id, item_id, num_in_stock, num_on_order from STOCK11
    UNION ALL
    select 2 as branch, warehouse_id, item_id, num_in_stock, num_on_order from STOCK12
    UNION ALL
    select 3 as branch, warehouse_id, item_id, num_in_stock, num_on_order from STOCK13
    UNION ALL
    select 4 as branch, warehouse_id, item_id, num_in_stock, num_on_order from STOCK21
    UNION ALL
    select 5 as branch, warehouse_id, item_id, num_in_stock, num_on_order from STOCK22
    UNION ALL
    select 6 as branch, warehouse_id item_id, num_in_stock, num_on_order from STOCK23
    UNION ALL

```
select 7 as branch, warehouse_id, item_id, num_in_stock,
    num_on_order from STOCK31
UNION ALL
select 8 as branch, warehouse_id, item_id, num_in_stock,
    num_on_order from STOCK32
UNION ALL
select 9 as branch, warehouse_id, item_id, num_in_stock,
    num_on_order from STOCK33
```

In this example, the view STOCK has a partitioning column on the combined columns warehouse_id and item_id, even though there is overlapping data sets along two dimensions. A partitioning column exists in warehouse_id and item_id because the combined columns are able to uniquely identify a two dimensional area which does not overlap with any other two dimensional area and thus implying that the two combined columns are capable of acting as a partitioning column to uniquely identify every row of data in every data object access by the sub-query. Both item_id and warehouse_id could be used on their own as partitioning columns since they could still be used to reduce the number of sub-queries that would be executed, however its usefulness is significantly less than the combination of the two columns. An independent partitioning column of the UNION ALL is the derived column "branch", the first expression of each sub-query.

If valid partitioning columns are found at step 428, then the module proceeds to the second broad step in the predetermination of sub-query relevance. On this second step it is determined if the parent query is only going to access a specific subset of the available sub-queries by proceedings down path 432 from step 428 to step 434.

In step 434, the routine stores each partitioning that was found based on partitioning columns identified in step 412 and 428. A partitioning is simply a listing of the partitioning column or columns that provides an index into the different sub-queries of the UNION ALL operator and the related demarcations from the combined value graph. These demarcations specify how the partitioning column(s) can be used to determine which sub-queries of the UNION ALL are relevant.

Following step 434, step 436 initiates a further program loop to evaluate each possible partitioning of the UNION ALL to determine if each partitioning is useful with respect to the parent query of the UNION ALL operator. This is done by proceeding along path 437 to step 438, where the partitioning is analyzed against the parent query. At step 438, the partitioning is evaluated to determine if it satisfies the requirements of the parent query. A partitioning satisfies the requirements of a parent query only if the parent query has query predicates on every partitioning column(s) of that partitioning. In the embodiment, extra predicates are acceptable, so long as the partitioning columns have predicates.

When examining predicates of the parent query in step 438, it is necessary that every partitioning column defined for the partitioning in question maps onto a query predicate. For example, with respect to the simple two dimensional stock database described above, if a view STOCK was created using the SQL statement of example 1 providing a UNION ALL of the table objects STOCK11, STOCK12 and STOCK13, then the following list of predicates in the parent query are representative of predicates that would make the partitioning column of warehouse_id useful (that is, having predicates that map onto each partitioning column):

warehouse_id=:warehouse
warehouse_id between :lowerid and :upperid
warehouse_id in (:wh1, :wh2, :wh3, :wh4)
warehouse_id=max(t1.warehouse_id) where t1.warehouse_id is the column warehouse_id from a joining table t1.
warehouse_id=t2.warehouse_id where t2.warehouse_id is the column warehouse_id from a correlated table t2.

If, for the particular partitioning in question, this condition for query proving is not satisfied, then path 440 is taken to step 444 whereby that particular partitioning is discarded and removed from further consideration, and then path 446 is taken to step 450 to evaluate if there are more partitionings to be analyzed. However, if at step 438 it is determined that the partitioning satisfies the required condition of the parent query by having a parent query predicate map onto every partitioning column for the partitioning, then path 442 is taken to step 448 whereby the partitioning is updated with any data restrictions of the parent query. Such data restrictions may be data ranges or set constraints of the predicate(s) of the parent query, as discussed above.

Following step 448, at step 450 it is determined if there are further partitionings that need to be evaluated. If there are, then path 452 is taken back to step 436 for further evaluation of the further partitioning by proceeding into path 437 again. However, if at step 450 it is determined that no further partitionings are to be analyzed, then path 454 is taken to step 456 to determine if there are any valid partitionings remaining that are useful to the parent query. If the number of remaining valid partitionings is zero, then path 462 is taken to end the pre-determination of sub-query relevance routine at step 468, since this would imply that pre-determination of sub-query relevance has failed to find any useful partitioning for use in generating superior query optimization. However, if more than one valid partitionings are remaining at step 456, then path 458 is taken to step 459 to select the best partitioning to be used when executing the UNION ALL operator. The evaluation of which partitioning to choose at step 459 may be made on a number of different heuristics including: the number of partitioning columns in the partitioning; the size of the data objects that will be accessed by each partitioning; the number of sub-queries to execute; performance statistics relating to particular data objects; the cost of using the partitioning; and other desirable criteria. After the "best" partitioning is chosen at step 459, or if at step 456 it is determined that there is only one partitioning that is valid for execution with the parent query and path 460 is taken to step 464 where the chosen or remaining partitioning is associated with UNION ALL operator and the predicates from the parent operations that satisfied that partitioning.

If a partitioning was stored with the UNION ALL operator at step 464 then the final broad step of executing the parent operator(s) and the UNION ALL operator begins. When executing the UNION ALL in conjunction with the partitioning, the UNION ALL operator will use that partitioning information proved in prior steps to determine which sub-queries need to be executed. It's determination of which sub-queries need to be executed is analogous to the execution of SQL CASE predicate except that multiple columns can be returned from each sub-query and more than one sub-query may be executed. Also there are special cases, for example the best partitioning columns of all the sub-queries form a disjoint and continuous range of values, which are evaluated using special formulae for determining the relevant sub-queries. It will be appreciated that, nevertheless, a generalized execution mechanism, analogous to the SQL CASE predicate, may accomplish the same result.

For example, consider the simple STOCK view from Example 1 above and the following SQL query:

select warehouse_id, sum(num_in_stock) as total_in_
    stock, sum(num_on_order) as total_on_order
from STOCK
where warehouse_id=:warehouse
group by warehouse_id Recall that the view STOCK is generated from a UNION ALL statement, and that the warehouse_id column was identified as a partitioning column in the above example. If this partitioning is used to generate a Union predicate, step 464 would generate a Union predicate that is functionally equivalent to the following CASE expression representing the Union predicate:

---

| | | |
|---|---|---|
| CASE | WHEN | :warehouse between 1 and 100 THEN <Execute Sub-query against STOCK1> |
| | WHEN | :warehouse between 101 and 200 THEN <Execute Sub-query against STOCK 2> |
| | WHEN | :warehouse between 201 and 300 THEN <Execute Sub-query against STOCK3> |
| END | | |

---

In the above example, the evaluation of the UNION ALL using the partitioning does not require the generation of the logical data object STOCK by executing each sub-query of the UNION ALL as would be necessary without pre-determination of sub-query relevance. Instead, the partitioning in conjunction with the variables from the parent operator predicates is evaluated at runtime to determine which sub-query or sub-queries of the UNION ALL operator is to be executed to provide the results required by the parent query.

Although the invention has been described with reference to certain specific embodiments, various modifications thereof will be apparent to those skilled in the art without departing from the spirit and scope of the invention as outlined in the claims appended hereto.

The invention claimed is:

1. A data processing system implemented method of a processor coupled to a memory for directing a data processing system to process a query against data objects, the data objects being operatively coupled to the data processing system, the query including a parent operator, the parent operator referencing a union operator, the union operator referencing sub-queries, the sub-queries referencing the data objects, the data processing system implemented method comprising:

noting a set of partitionings for the union operator, the noted set of partitionings being based on the sub-queries and being based on the data objects referenced by the sub-queries, wherein each partitioning of the noted set of partitionings comprises at least one column of a sub-query having a constrained value set; and executing the query having the union operator, the execution of the query being based on the noted set of partitionings and the parent operator, wherein the executing of the query having the union operator comprises:

matching predicates and functional dependencies associated with the parent operator to each partitioning, and evaluating the predicates to determine whether each partitioning column defined for a partitioning maps onto a predicate to satisfy a required condition of the query; and discarding any unsatisfactory partitionings which do not satisfy the required condition of the query;

wherein the noting of the set of partitioning for the union operator comprises:

gathering data restrictions for the data objects referenced by the union operator;

analyzing the gathered data restrictions, the analyzed gathered data restrictions identifying valid data contained in the data objects; and generating the set of partitionings based on the analyzed gathered data.

2. The data processing system implemented method of claim 1 wherein the union operator is a union all operator.

3. The data processing system implemented method of claim 1 wherein the gathering of the data restrictions comprises:

retrieving, for each data object, data constraints, functional dependencies and keys from a catalog of the data processing system;

retrieving predicates and expressions from a sub-query selected from the sub-queries, the retrieved predicates and the retrieved expressions placing additional restrictions on data contained in the data objects; and inferring additional data restrictions from a combination of the retrieved data constraints, the retrieved functional dependencies, the retrieved keys, the retrieved predicates and the retrieved expressions.

4. The data processing system implemented method of claim 3 wherein the inferring of the additional data restrictions comprises:

demarcating a value graph according to the retrieved data constraints, the retrieved predicates and the retrieved expressions; and adding additional demarcations by combining the retrieved functional dependencies and the retrieved keys with existing demarcations contained in the value graph.

5. The data processing system implemented method of claim 1 wherein the analyzing of the gathered data restrictions comprises: mapping dimensions of value graphs for individual data objects to dimensions of the union operator; and combining the value graphs and the mapped dimensions into a value graph for the union operator with additional annotations associated with regions contained in the value graph, the annotations produced by the data objects.

6. The data processing system implemented method of claim 5 wherein the mapping of the dimensions of the value graphs comprises:

determining which dimension of each data object that corresponds to each particular dimension associated with the union operator by following a data flow from the union operator down to the each data object; and storing a set of corresponding dimensions in the mapped dimensions.

7. The data processing system implemented method of claim 5 wherein the combining of the value graphs comprises:

adding demarcations associated with the value graph of each data object to the value graph associated with the union operator; and adding an additional annotation to regions associated with the added demarcations, the additional annotation indicating which data object the demarcation originated therefrom.

8. The data processing system implemented method of claim 1 wherein the generating of the set of partitioning comprises:

examining all combinations of the dimensions in the value graph associated with the union operator to determine the minimal combination of dimensions that can uniquely identify each region in the value graph, the demarcations and the annotations of the value graph related to the minimal combination is a partitioning.

9. The data processing system implemented method of claim 1 wherein the executing of the query having the union operator further comprises:
- determining an optimal partitioning using a combination of a costing method, a statistical method and a heuristic method; and
- using the determined optimal partitioning, the matched predicates and the matched functional dependencies for the purpose of executing the query against the data objects, the executing query accessing those data objects that are relevant to the query.

10. The data processing system implemented method of claim 1 wherein the matching of the each partitioning comprises:
- finding the predicates and the functional dependencies that involve any dimension of the partitioning; and
- discarding the partitioning if any dimension does not have at least one of a suitable predicate and a suitable functional dependency, when every dimension of the partitioning has at least one suitable predicate then the partitioning is satisfied.

11. The data processing system implemented method of claim 9 wherein the using of the determined optimal partitioning comprises: determining which data objects provides data relevant to the query by combining the matched predicates, the matched functional dependencies and the optimal partitioning; and retrieving data from the determined data objects.

12. The data processing system implemented method of claim 1, wherein the union operator invokes each of at least one input sub-query, and the at least one input sub-query accesses any required data objects to perform a specified operation on the required data objects and returns the results to the union operator.

13. A data processing system for processing a query against data objects, the data objects being operatively coupled to the data processing system, the query including a parent operator, the parent operator referencing a union operator, the union operator referencing sub-queries, the sub-queries referencing the data objects, the data processing system comprising:
- a processor coupled to a memory executing software instruction, said instruction comprising:
- a noting module for noting a set of partitionings for the union operator, the noted set of partitionings being based on the sub-queries and being based on the data objects reference by the sub-queries, wherein each partitioning of the noted set of partitionings comprises at least one column of a sub-query having a constrained value set; and
- an executing module for executing the query having the union operator, the execution of the query being based on the noted set of partitionings and the parent operator, wherein the executing module comprises:
  - a matching module for matching predicates and for matching functional dependencies associated with the parent operator to each partitioning, and for evaluating the predicates to determine whether each partitioning column defined for a partitioning maps onto a predicate to satisfy a required condition of the query; and
  - a discarding module for discarding any unsatisfactory partitionings which do not satisfy the required condition of the query;
- wherein the noting module for noting of the set of partitionings for the union operator comprises:
- a gathering module for gathering data restrictions for the data objects referenced by the union operator;
- an analyzing module for analyzing the gathered data restrictions, the analyzed gathered data restrictions identifying valid data contained in the data objects; and
- a generating module for generating the set of partitionings based on the analyzed gathered data.

14. The data processing system of claim 13 wherein the union operator is a union all operator.

15. The data processing system of claim 13 wherein the gathering module for gathering of the data restrictions comprises:
- a first retrieving module for retrieving, for each data object, data constraints, functional dependencies and keys from a catalog of the data processing system;
- a second retrieving module for retrieving predicates and expressions from a sub-query selected from the sub-queries, the retrieved predicates and the retrieved expressions placing additional restrictions on data contained in the data objects; and
- an inferring module for inferring additional data restrictions from a combination of the retrieved data constraints, the retrieved functional dependencies, the retrieved keys, the retrieved predicates and the retrieved expressions.

16. The data processing system of claim 15 wherein the inferring module for inferring of the additional data restrictions comprises:
- a demarcating module for demarcating a value graph according to the retrieved data constraints, the retrieved predicates and the retrieved expressions; and
- an adding module for adding additional demarcations by combining the retrieved functional dependencies and the retrieved keys with existing demarcations contained in the value graph.

17. The data processing system of claim 13 wherein the analyzing module for analyzing of the gathered data restrictions comprises:
- a mapping module for mapping dimensions of value graphs for individual data objects to dimensions of the union operator; and
- a combining module for combining the value graphs and the mapped dimensions into a value graph for the union operator with additional annotations associated with regions contained in the value graph, the annotations produced by the data objects.

18. The data processing system of claim 17 wherein the mapping module for mapping of the dimensions of the value graphs comprises:
- a determination module for determining which dimension of each data object that corresponds to each particular dimension associated with the union operator by following a data flow from the union operator down to the each data object; and
- a storing module for storing a set of corresponding dimensions in the mapped dimensions.

19. The data processing system of claim 17 wherein the combining of the value graphs comprises:
- an addition module for adding demarcations associated with the value graph of each data object to the value graph associated with the union operator; and
- an adding module for adding an additional annotation to regions associated with the added demarcations, the additional annotation indicating which data object the demarcation originated therefrom.

20. A The data processing system of claim 13 wherein the generating module for generating of the set of partitioning comprises:

an examining module for examining all combinations of the dimensions in the value graph associated with the union operator to determine the minimal combination of dimensions that can uniquely identify each region in the value graph, the demarcations and the annotations of the value graph related to the minimal combination is a partitioning.

21. data processing system of claim 13 wherein the executing module for executing of the query having the union operator comprises:
   a determining module for determining an optimal partitioning using a combination of a costing method, a statistical method and a heuristic method; and
   a using module for using the determined optimal partitioning, the matched predicates and the matched functional dependencies for the purpose of executing the query against the data objects, the executing query accessing those data objects that are relevant to the query.

22. The data processing system of claim 13 wherein the matching module for matching of the each partitioning comprises:
   a finding module for finding the predicates and the functional dependencies that involve any dimension of the partitioning;
   a discarding module for discarding the partitioning if any dimension does not have at least one of a suitable predicate and a suitable functional dependency, when every dimension of the partitioning has at least one suitable predicate then the partitioning is satisfied.

23. The data processing system of claim 21 wherein the using module for using of the determined optimal partitioning comprises:
   a determination module for determining which data objects provides data relevant to the query by combining the matched predicates, the matched functional dependencies and the optimal partitioning; and
   a retrieving module for retrieving data from the determined data objects.

24. The data processing system of claim 13, wherein the union operator invokes each of at least one input sub-query, and the at least one input sub-query accesses any required data objects to perform a specified operation on the required data objects and returns the results to the union operator.

25. A hardware medium for directing a data processing system to process a query against data objects, the data objects being operatively coupled to the data processing system, the query including a parent operator, the parent operator referencing a union operator, the union operator referencing sub-queries, the sub-queries referencing the data objects, the hardware medium comprising:
   software instructions on said hardware medium embodying one or more instructions executable by the data processing system, the one or more instructions comprising:
   data processing system executable instructions for noting a set of partitionings for the union operator, the noted set of partitionings being based on the sub-queries and being based on the data objects reference by the sub-queries, wherein each partitioning of the noted set of partitionings comprises at least one column of a sub-query having a constrained value set; and
   data processing system executable instructions for executing the query having the union operator, the execution of the query being based on the noted set of partitionings and the parent operator, wherein the data processing system executable instructions for executing of the query having the union operator comprises:
   data processing system executable instruction for matching predicates and functional dependencies associated with the parent operator to each partitioning, and for evaluating the predicates to determine whether each partitioning column define for a partitioning maps onto a predicate to satisfy a required condition of the query;
   data processing system executable instructions for discarding any unsatisfactory partitionings which do not satisfy the required condition of the query
   wherein the data processing system executable instructions for noting of the set of partitionings for the union operator comprises:
   data processing system executable instructions for gathering data restrictions for the data objects referenced by the union operator;
   data processing system executable instructions for analyzing the gathered data restrictions, the analyzed gathered data restrictions identifying valid data contained in the data objects; and
   data processing system executable instructions for generating the set of partitionings based on the analyzed gathered data.

26. The hardware medium of claim 25 wherein the union operator is a union all operator.

27. The hardware medium of claim 25 wherein the data processing system executable instructions for gathering of the data restrictions comprises:
   data processing system executable instructions for retrieving, for each data object, data constraints, functional dependencies and keys from a catalog of the data processing system;
   data processing system executable instructions for retrieving predicates and expressions from a sub-query selected from the sub-queries, the retrieved predicates and the retrieved expressions placing additional restrictions on data contained in the data objects; and
   data processing system executable instructions for inferring additional data restrictions from a combination of the retrieved data constraints, the retrieved functional dependencies, the retrieved keys, the retrieved predicates and the retrieved expressions.

28. The hardware medium of claim 27 wherein the data processing system executable instructions for inferring of the additional data restrictions comprises: data processing system executable instructions for demarcating a value graph according to the retrieved data constraints, the retrieved predicates and the retrieved expressions; and
   data processing system executable instructions for adding additional demarcations by combining the retrieved functional dependencies and the retrieved keys with existing demarcations contained in the value graph.

29. The hardware medium of claim 25 wherein the data processing system executable instructions for analyzing of the gathered data restrictions comprises:
   data processing system executable instructions for mapping dimensions of value graphs for individual data objects to dimensions of the union operator; and
   data processing system executable instructions for combining the value graphs and the mapped dimensions into a value graph for the union operator with additional annotations associated with regions contained in the value graph, the annotations produced by the data objects.

30. The hardware medium of claim 29 where the data processing system executable instructions for mapping of the dimensions of the value graphs comprises:

data processing system executable instructions for determining which dimension of each data object that corresponds to each particular dimension associated with the union operator by following a data flow from the union operator down to the each data object; and data processing system executable instructions for storing a set of corresponding dimensions in the mapped dimensions.

31. The hardware medium of claim 29 wherein the data processing system executable instructions for combining of the value graphs comprises:

data processing system executable instructions for adding demarcations associated with the value graph of each data object to the value graph associated with the union operator; and data processing system executable instructions for adding an additional annotation to regions associated with the added demarcations, the additional annotation indicating which data object the demarcation originated therefrom.

32. The hardware medium of claim 25 wherein the data processing system executable instructions for generating of the set of partitioning comprises:

data processing system executable instructions for examining all combinations of the dimensions in the value graph associated with the union operator to determine the minimal combination of dimensions that can uniquely identify each region in the value graph, the demarcations and the annotations of the value graph related to the minimal combination is a partitioning.

33. The hardware medium of claim 25 wherein the data processing system executable instructions for executing of the query having the union operator further comprises:

data processing system executable instructions for discarding any unsatisfactory partitionings; data processing system executable instructions for determining an optimal partitioning using a combination of a costing method, a statistical method and a heuristic method; and data processing system executable instructions for using the determined optimal partitioning, the matched predicates and the matched functional dependencies for the purpose of executing the query against the data objects, the executing query accessing those data objects that are relevant to the query.

34. The hardware medium of claim 25 wherein the data processing system executable instructions for matching of the each partitioning comprises:

data processing system executable instructions for finding the predicates and the functional dependencies that involve any dimension of the partitioning; and data processing system executable instructions for discarding the partitioning if any dimension does not have at least one of a suitable predicate and a suitable functional dependency, when every dimension of the partitioning has at least one suitable predicate then the partitioning is satisfied.

35. The hardware medium of claim 33 wherein the data processing system executable instructions for using of the determined optimal partitioning comprises:

data processing system executable instructions for determining which data objects provides data relevant to the query by combining the matched predicates, the matched functional dependencies and the optimal partitioning; and data processing system executable instructions for retrieving data from the determined data objects.

36. The hardware medium of claim 25, wherein the union operator invokes each of at least one input sub-query, and the at least one input sub-query accesses any required data objects to perform a specified operation on the required data objects and returns the results to the union operator.

* * * * *